United States Patent
Mittendorf

(10) Patent No.: US 8,024,918 B2
(45) Date of Patent: Sep. 27, 2011

(54) ROCKET MOTOR HAVING A CATALYTIC HYDROXYLAMMONIUM (HAN) DECOMPOSER AND METHOD FOR COMBUSTING THE DECOMPOSED HAN-BASED PROPELLANT

(75) Inventor: Donald L. Mittendorf, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 797 days.

(21) Appl. No.: 12/111,562

(22) Filed: Apr. 29, 2008

(65) Prior Publication Data
US 2009/0266049 A1 Oct. 29, 2009

(51) Int. Cl.
*C06D 5/00* (2006.01)
*C06D 5/06* (2006.01)

(52) U.S. Cl. ............ 60/205; 60/257; 60/214; 60/218
(58) Field of Classification Search ............ 60/200.1, 60/204, 205, 214, 215, 218, 257, 258, 260
See application file for complete search history.

(56) References Cited

U.S. PATENT DOCUMENTS

| | | | |
|---|---|---|---|
| 2,722,100 A | 11/1955 | Goddard | |
| 3,651,644 A | 3/1972 | Breen et al. | |
| 3,871,828 A * | 3/1975 | Ellion et al. | 422/607 |
| 4,069,664 A * | 1/1978 | Ellion et al. | 60/258 |
| 4,527,389 A * | 7/1985 | Biddle et al. | 60/207 |
| 4,635,885 A * | 1/1987 | Hujsak | 244/169 |
| 5,117,627 A * | 6/1992 | Runavot | 60/218 |
| 5,223,057 A | 6/1993 | Mueller et al. | |
| 5,485,722 A * | 1/1996 | Schmidt et al. | 60/219 |
| 5,608,179 A | 3/1997 | Voecks et al. | |
| 5,703,323 A | 12/1997 | Rothgery et al. | |
| 6,047,541 A * | 4/2000 | Hampsten | 60/259 |
| 6,361,629 B2 | 3/2002 | Mahaffy | |
| 6,393,830 B1 | 5/2002 | Hamke et al. | |
| 6,931,832 B2 * | 8/2005 | Berg et al. | 60/206 |
| 6,984,273 B1 | 1/2006 | Martin et al. | |
| 7,137,244 B2 | 11/2006 | Gronland et al. | |
| 7,757,476 B2 * | 7/2010 | Coste | 60/257 |
| 2009/0211227 A1 * | 8/2009 | Loehr | 60/254 |

FOREIGN PATENT DOCUMENTS
JP 2009085155 A * 4/2009
* cited by examiner

*Primary Examiner* — William Rodriguez
(74) *Attorney, Agent, or Firm* — Ingrassia Fisher & Lorenz, P.C.

(57) ABSTRACT

Methods and systems are provided for propelling a vehicle. In an embodiment, by way of example only, a method includes flowing a decomposed hydroxylammonium nitrite (HAN)-based propellant into a chamber, introducing an aspirated non-polar fuel into the chamber, and combusting the decomposed HAN-based propellant and the aspirated non-polar fuel to produce an exhaust gas.

18 Claims, 3 Drawing Sheets

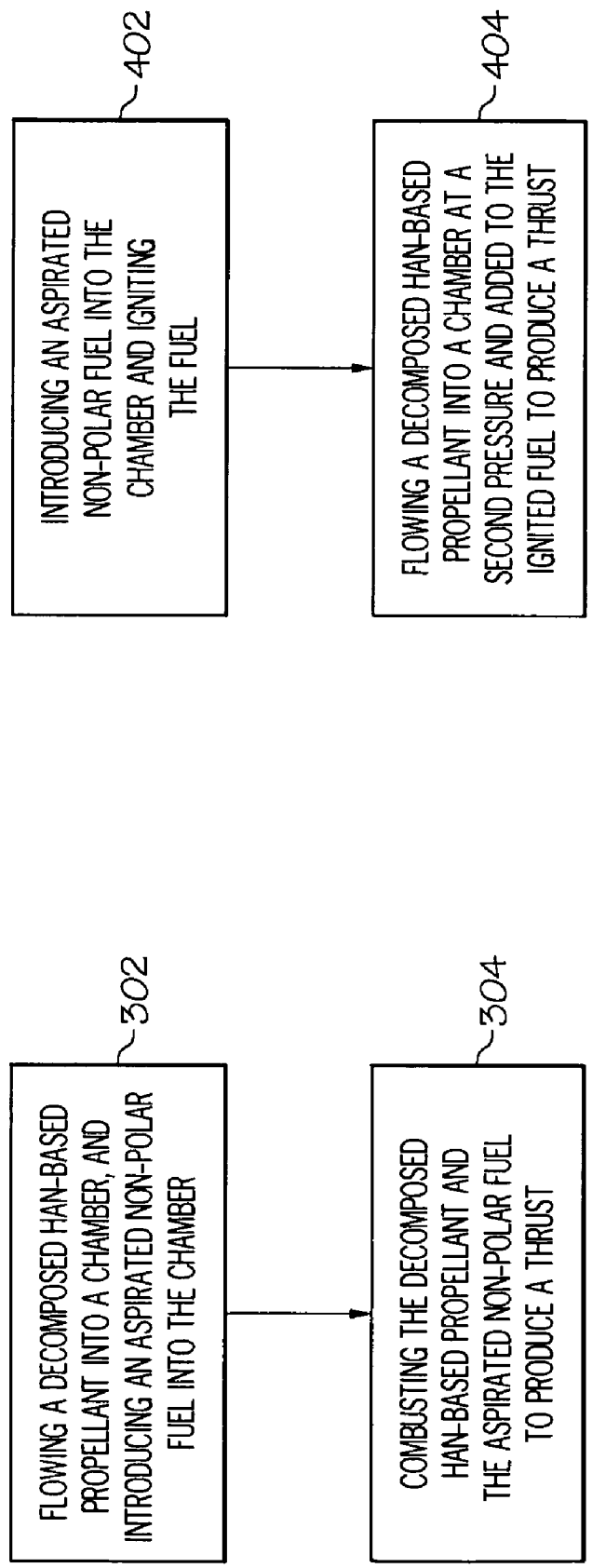

ROCKET MOTOR HAVING A CATALYTIC HYDROXYLAMMONIUM (HAN) DECOMPOSER AND METHOD FOR COMBUSTING THE DECOMPOSED HAN-BASED PROPELLANT

TECHNICAL FIELD

The inventive subject matter generally relates to vehicles, such as rockets, and more particularly relates to systems and methods of propelling vehicles.

BACKGROUND

Propulsion systems are used to generate thrust to achieve or maintain flight, or to control in-flight direction of vehicles, such as rockets, missiles, spacecraft, and/or aircraft. In many cases, a propulsion system may include a vessel that defines a combustion chamber in which fuel is loaded and combusted to generate high-energy combustion gas. A nozzle may be in fluid communication with the combustion chamber to receive the high-energy combustion gas and exhaust the gas out of the vessel to generate a thrust.

Conventionally, the fuel used for generating the thrust is stored external to the combustion chamber until system operation is desired. One commonly-used fuel is a monopropellant material made up of hydrazine. The monopropellant material is stored in a storage tank and is ignited by a rapid decomposition of the fuel by exposure to an iridium based catalyst. Another storable chemical propulsion system may include two hypergolic chemicals, such as monomethylhydrazine and nitrogen tetraoxide. When mixed together in a combustion chamber, the two chemicals may react to ignite and produce a hot gas (e.g., gases having a temperature greater than 1400° C.) and a desired thrust.

Although the aforementioned systems are adequate for use in many circumstances, they may be improved. In particular, some propellants may be suitable for use and/or storage on space vehicles, but they may not be useful on vehicles in which environmental considerations may be of concern, such as on naval vessels or aircraft. In other cases, monopropellants that may be considered "environmentally friendly" may have low energy density resulting in larger storage tanks that may add unwanted weight and/or may undesirably occupy space. In other cases, environmentally-friendly solid propulsion systems may not have capabilities that liquid bi- and mono-propellants provide, such as shut off capabilities and/or throttleability. Additionally, the aforementioned systems may not provide adequate thrust for propelling certain types of vehicles, and thus, uses of the systems may be limited. Moreover, although environmentally-friendly bi-propellants may have improved energy density compared to monopropellants, they may not include hypergolic chemicals. Thus, they may not be as reliable to rapidly startup and/or to operate in some altitudes as in others.

Accordingly, it is desirable to have an improved, environmentally-friendly liquid propulsion system and/or method of propelling a vehicle that may be relatively inexpensive and simple to implement. In addition, it is desirable to have a liquid propulsion system that provides improved thrust and is more lightweight than conventional environmentally-friendly liquid systems. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods and systems are provided for propelling a vehicle.

In an embodiment, by way of example only, a method includes flowing a decomposed hydroxylammonium nitrite (HAN)-based propellant into a chamber, introducing an aspirated non-polar fuel into the chamber, and combusting the decomposed HAN-based propellant and the aspirated non-polar fuel to produce an exhaust gas.

In another embodiment, by way of example only, a method includes introducing an aspirated non-polar fuel into a chamber at a first pressure, igniting the aspirated non-polar fuel, and flowing a decomposed hydroxylammonium nitrate (HAN)-based propellant into the chamber at a second pressure to thereby produce a thrust to propel the vehicle.

In still another embodiment, by way of example only, a system for propelling a vehicle includes a vessel that defines a chamber, a decomposer an aspirator, and a combustor. The decomposer is positioned in the chamber to divide the chamber into an upstream reception section and a downstream combustion section, wherein the decomposer is adapted to decompose a hydroxylammonium nitrate (HAN)-based propellant provided to the upstream reception section and to provide a decomposed HAN-based propellant to the downstream reception section. The aspirator is adapted to aspirate a non-polar fuel in order to provide an aspirated non-polar fuel to the downstream combustion section. The combustor is disposed in communication with the chamber, and is adapted to receive and combust the decomposed HAN-based propellant and the aspirated non-polar fuel to produce an exhaust gas.

BRIEF DESCRIPTION OF THE DRAWINGS

The inventive subject matter will hereinafter be described in conjunction with the following drawing figures, wherein like numerals denote like elements.

FIG. 3 is a flow diagram of a method of propelling a vehicle, according to an embodiment; and FIG. 4 is a flow diagram of a method of propelling a vehicle, according to another embodiment.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
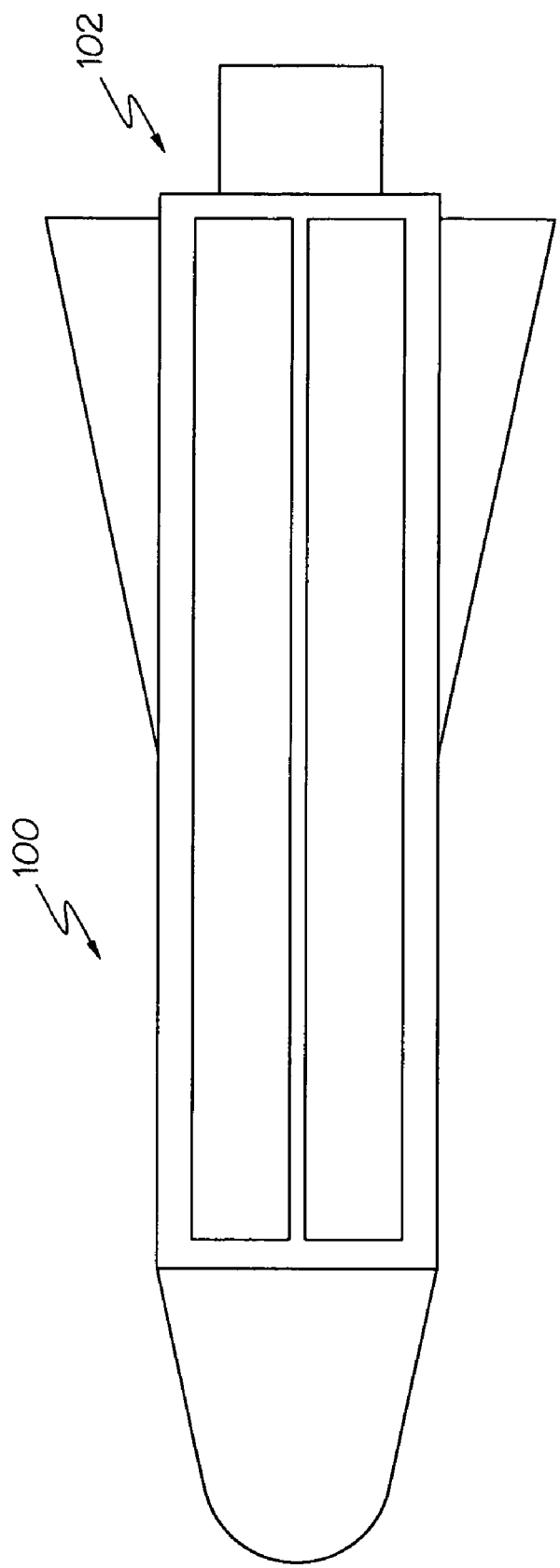
FIG. 1 is a simplified illustration of a vehicle including a propulsion system, according to an embodiment.

FIG. 1 is a simplified illustration of a vehicle 100 capable of being propelled in a desired direction, according to an embodiment. The vehicle 100 may be a missile, a rocket, an aircraft, a watercraft, a spacecraft, a land-based vehicle, or any other movable vehicle. To propel the vehicle 100, a propulsion system 102 may be included therewith. In an example, the propulsion system 102 may include various components, and some of the components may be disposed within the vehicle or may be coupled to the vehicle 100. In an embodiment, such as shown in FIG. 1, a single propulsion system 102 is included; however, in other embodiments, multiple propulsion systems may alternatively be included. Additionally, although the propulsion system 102 is shown as being disposed in a particular location within the vehicle 100, it may be alternatively located in another location provided that propulsion in the desired direction may be achieved.

Figure 2:
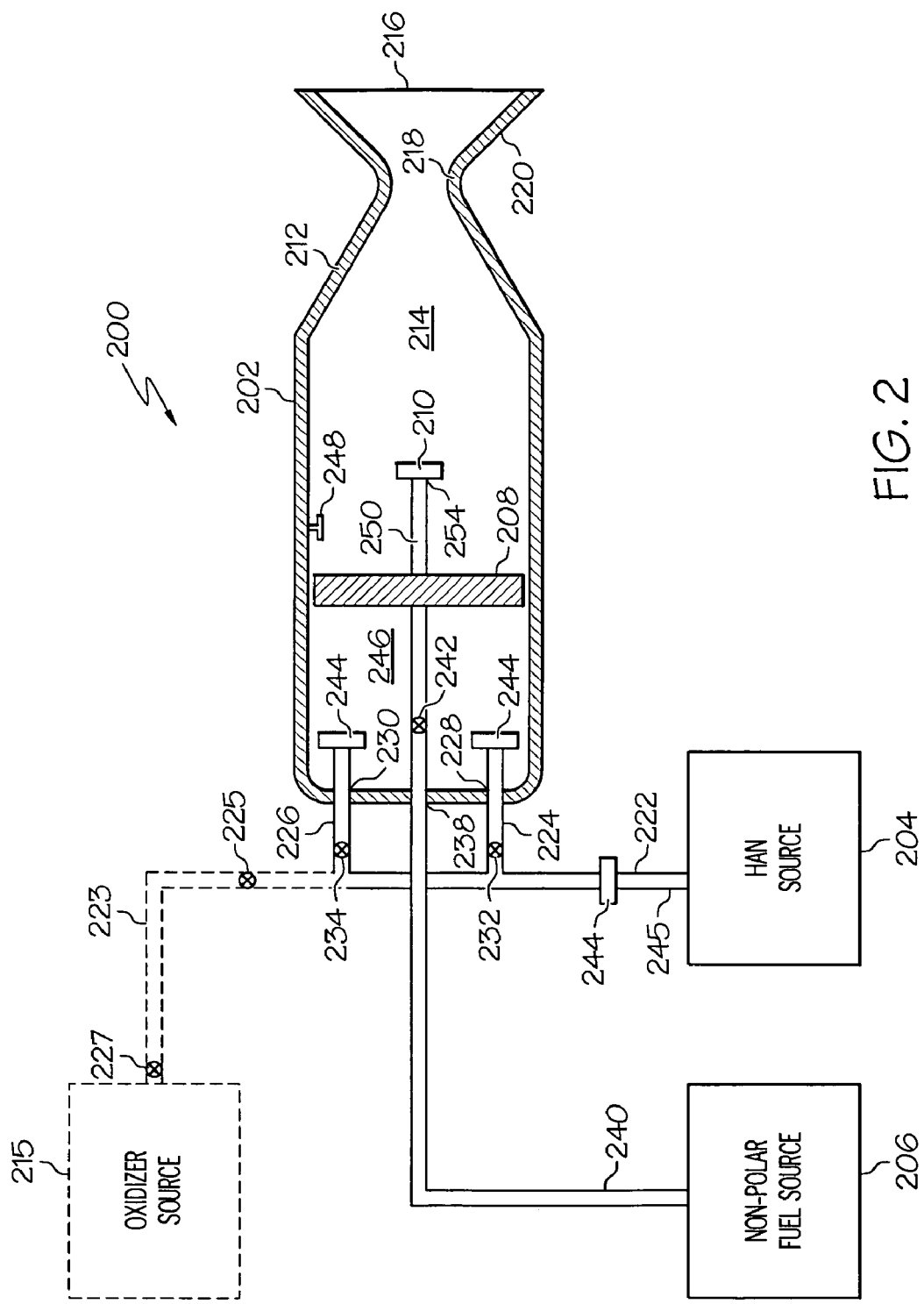
FIG. 2 is a cross-sectional, simplified view of a propulsion system, according to an embodiment.

FIG. 2 is a cross-sectional, simplified view of a propulsion system 200 that may be implemented into a vehicle, such as the vehicle 100 shown in FIG. 1, according to an embodiment. The propulsion system 200 may include a vessel 202, a hydroxylammonium nitrite (HAN)-based propellant supply source 204, a fuel supply source 206, a decomposer 208, an aspirator 210, and a combustor 211. The vessel 202 is configured to receive and combust gases that may be used to provide thrust to the vehicle 100 (FIG. 1). In this regard, the vessel 202 is made up of a wall 212 that defines a chamber 214 therein. The wall 212 may comprise material that may be capable of withstanding temperatures at which the gases may combust (e.g., temperatures greater than 1400° C.) and that may be corrosion-resistant when exposed to the combusted gases. The wall 212 may also have a thickness that is suitable for maintaining structural integrity when subjected to the combustion temperatures and/or to extreme pressures, such as pressures greater than 100 psig or less than 3000 psig. For example, the wall thickness may be between about 0.75 mm and about 25.00 mm, however, in other embodiments, the wall may be thicker or thinner.

As shown in FIG. 2, the wall 212 may be tubular to define an elongated, cylindrically-shaped chamber 214. The chamber 214 may have a length that is between about 25 mm and about 380 mm and may have a diameter that is between about 12.5 mm and about 152 mm to yield a volume of between about 3.1 mL and about 6.94 L. In other embodiments, the dimensions of the chamber 214 may be larger or smaller. In still other embodiments, the wall 212 and/or chamber 214 may be a different shape, such as spherical or cubical. In such cases, the dimensions of the wall 212 and/or chamber 214 may yield a volume that is greater than, smaller than or substantially equal to the range mentioned previously.

In addition to the chamber 214, the wall 212 also defines an exhaust outlet 216 that directs the combusted gases out of the vessel 202. In an embodiment, the exhaust outlet 216 may include a nozzle and may provide a divergent flowpath out of the chamber 214. For example, the exhaust outlet 216 may include a throat 218 and a diverging nozzle 220 that may extend therefrom, as shown in FIG. 2. The nozzle 220 may or may not be integrally formed as part of the vessel 202. In an embodiment, the throat 218 may have a diameter that is between about 1.27 mm and about 66.04 mm, while a widest portion of the nozzle 220 may have a diameter that is between about 1.27 mm and about 152.04 mm. In other embodiments, the dimensions of the throat 218 and the nozzle 220 may be greater or less, and may depend on the dimensions of the chamber 214. In an alternative embodiment, the throat 218 may not be included and the exhaust outlet 216 may be a simple opening having a diameter that is less than that of the chamber 214.

To produce the combusted gases, the HAN-based propellant supply source 204 and the fuel supply source 206 supply combustible materials to the chamber 214. In an embodiment, the HAN-based propellant supply source 204 may be a storage tank or other container that includes a HAN-based propellant that comprises hydroxylammonium nitrite (HAN). In an embodiment, the HAN-based propellant may be an aqueous solution. For example, the HAN-based propellant may include water. In another embodiment, the HAN-based propellant may also include a startup oxidizer. The startup oxidizer may be oxygen or another substance capable initiating combustion of the fuel with a spark or heat source but without a catalyst. The HAN-based propellant may be stored in a non-pressurized manner and subsequently pressurized or pumped during operation depending on its particular formulation and/or the space limitations of the system.

In any case, the HAN-based propellant supply source 204 communicates with the vessel 202 via a first connection line 222. The first connection line 222 may be a duct, pipe, or any other component suitable for flowing the HAN-based propellant therethrough. In an embodiment, the first connection line 222 includes multiple branches 224, 226 that provide the propellant to the vessel chamber 214 through first and second inlets 228, 230 formed in the vessel wall 212. In other embodiments, the first connection line 222 may include more than two branches and thus, more inlets may be included in the vessel wall 212. One or more valves 232, 234 may be disposed in each of the branches 224, 226 to thereby control flow of the HAN-based propellant into the chamber 214. The valves 232, 234 may be ball, poppet, or pintle-type valves, or any other type of valve suitable for flow regulation.

As mentioned briefly above, the HAN-based propellant may be formulated to include a startup oxidizer; however, in other embodiments, the HAN-based propellant may not include the startup oxidizer. Instead, an additional oxidizer may be dispose separately from the HAN-based propellant in a separate oxidizer supply source 215 (shown in phantom). The oxidizer supply source 215 may or may not be pressurized and may fluidly communicate with injectors 244 (discussed in more detail below), which may supply the additional oxidizer at a pressure that is lower than the pressure of the HAN-based propellant. In an embodiment, the oxidizer supply source 215 may also be coupled to the HAN-based propellant supply source 204 via an oxidizer line 223. However, the oxidizer supply source 215 may not communicate with HAN-based propellant supply source 204 until propulsion is desired. In an example, the HAN-based propellant supply source 204 may store the HAN-based propellant as an unpressurized liquid that may be pressurized to a pressure on initiation of flow into the combustion chamber, and the HAN-based propellant supply source 204 may be restricted by a one-way valve 225. The one-way valve 225 may be activated upon a pressure differential between the pressure at which the additional oxidizer and the pressure of the HAN-based propellant are supplied to the chamber 214. In an alternative embodiment, the oxidizer line 223 may include a regulator valve 227 disposed therein for controlling an amount of oxidizer that is to be mixed with the HAN-based propellant from the HAN-based propellant supply source 204. In another embodiment, the additional oxidizer can also communicate directly with the chamber 214 and may be independent from the HAN supply.

The fuel supply source 206 may be a storage tank or other vessel and may provide a fuel to the chamber 214 to be added to the decomposed HAN-based propellant. In an embodiment, the fuel may comprise a non-polar fuel, such as a hydrocarbon-based fuel, including jet fuel or an alcohol such as 2-propanol. The fuel may or may not be stored under pressure. For example, the fuel may be pressurized in storage, or may be pressurized on startup of the rocket or may be pumped. In any case, the manner in which the fuel is stored may depend on the particular composition thereof or space limitations of the system 200.

The supply source 206 may fluidly communicate with the chamber 214 via a third inlet 238 in the vessel 202. Although a single inlet 238 communicates with the fuel supply source 206, more inlets may alternatively be included in the vessel 202. In any case, fluid communication between the non-polar fuel supply source 206 and the chamber 214 is provided by a second connection line 240, which may be a duct, pipe, or any other type of component suitable for flowing the non-polar fuel to the vessel 202. A valve 242 may be disposed within the second connection line 240 to control the flow of the non-polar fuel therethrough. The valve 242 may be a ball, poppet, or pintle, or any other type of valve capable of regulating flow through the line 236. Although a single valve is shown in FIG. 1, more may alternatively be included in other embodiments.

As alluded to above, before the HAN-based propellant and the non-polar fuel are combusted, they may be subjected to one or more preparation steps by one or more devices. In an embodiment, the HAN-based propellant is decomposed before it is introduced into the chamber 214. In such case, one or more injectors 244 adapted to receive the HAN-based propellant from the HAN-based propellant supply source 204 may be in flow communication therewith. For example, in an embodiment, an injector 244 may be disposed in a main line 245 of the first connection line 222, according to an embodiment. In another example, one or more injectors 244 may be disposed in each of the branches 224, 226 of the first connection line 222. For instance, one or more injectors 244 may be located at each end of the branches 224, 226 as illustrated in FIG. 2. Although a single injector 244 is shown disposed in each branch 224, 226, more or fewer may alternatively be included. In still other embodiments, the injectors 244 may be included at all or some of the locations shown in FIG. 2. Additionally, although injectors 244 are shown at particular locations in the first connection line 222, they may be located at other locations upstream from the chamber 214 and not in the first connection line 222, in other embodiments. The injectors 244 may be made up of any device suitable for introducing the liquid HAN into the chamber 214.

After injection, the HAN-based propellant may be decomposed, and thus, may be subjected to a decomposer 208. Desirably, the HAN-based propellant is decomposed before contacting the fuel. The term "decompose" is defined herein as breaking down the HAN-based propellant into lower energy constituents. The decomposer 208 may be disposed between the HAN-based propellant supply source 204 and adapted to receive and decompose the HAN-based propellant. In an embodiment, the decomposer 208 may catalytically decompose the HAN-based propellant and may include a catalyst bed. In such case, the catalyst bed may include a catalyst, such as Shell 405 available through Shell Oil Company of Houston, Tex., or any other material suitable for catalyzing the HAN-based propellant. In another embodiment, the decomposer 208 may thermally decompose the HAN-based propellant. For example, the decomposer 208 may include a thermal bed capable of heating the HAN-based propellant to a particular temperature. Suitable temperatures may be within a range of between about 200° C. to about 550° C., however, the particular temperature may depend on the particular composition of the HAN-based propellant.

To ensure the HAN-based propellant is decomposed before contacting the non-polar fuel, the decomposer 208 may be positioned within the chamber 214 to thereby divide the chamber 214 into an upstream reception section 246 and a downstream combustion section 248. The upstream reception section 246 receives vaporized HAN-based propellant from the first connection line 222. After the HAN-based propellant passes through the decomposer 208, it is directed into the downstream combustion section 248.

The downstream combustion section 248 receives the decomposed HAN-based propellant and the non-polar fuel. The non-polar fuel may be fed from a conduit 250 that extends from and/or is part of the second connection line 240. In an embodiment, as shown in FIG. 2, the conduit 250 extends through the decomposer 208 and terminates in the downstream combustion section 248. However, in other embodiments, the conduit 250 may not extend through the decomposer 208. In still other embodiments, the conduit 250 may extend through an opening located in a portion of the vessel 202 downstream of the decomposer 208.

Before entry into the downstream combustion section 248, the non-polar fuel is aspirated. In this regard, an aspirator 210 is disposed in flow communication with the non-polar fuel supply source 206. The aspirator 210 aspirates the non-polar fuel into a mist that is suitable for allowing a homogenous mixture of the decomposed HAN gas and aspirated non-polar fuel. Suitable aspirating devices capable of forming such mists include, but are not limited to hallow and solid cone spray nozzles.

The aspirator 210 may be disposed within the conduit 250, in an embodiment. Alternatively, in other embodiments, as shown in FIG. 2, the aspirator 210 may be located at an end 254 of the conduit 250 immediately upstream of the downstream combustion section 248 of the chamber 214. In still other embodiments, the aspirator 210 may be disposed external to the conduit 250, so long as it receives and aspirates the non-polar fuel before entry into the downstream combustion section 248 of the chamber 214.

The combustor 211 is disposed in communication with the chamber 214 and is adapted to ignite the vaporized HAN-based propellant and the aspirated non-polar fuel to produce a pressurized, hot exhaust gas (e.g., gas having a pressure greater than about 100 psig and a temperature greater than about 1400° C.). In an embodiment, the combustor 211 may include a spark plug, a coil capable of conducting a voltage to produce an ignition spark, or any other means for igniting the combustible materials. The combustor 211 may be coupled to an outer surface of the vessel 202 and may have an ignition component that extends into the downstream combustion section 248 of the chamber 214, in an embodiment. Alternatively, the combustor 211 may be disposed within the chamber 214.

FIG. 3 is a flow diagram of a method 300 of propelling a vehicle, according to an embodiment, that may be performed using system 200 shown in FIG. 2. In an embodiment, a decomposed HAN-based propellant is flowed into a chamber, and an aspirated non-polar fuel is introduced into the chamber, step 302. The decomposed HAN-based propellant and the aspirated non-polar fuel are then combusted to produce a thrust, step 304. These steps will now be described in detail below.

As briefly mentioned above, a decomposed HAN-based propellant and an aspirated non-polar fuel are introduced into a chamber, step 302. In an embodiment, with additional reference to FIG. 2, the decomposed HAN-based propellant may be produced by flowing HAN-based propellant from the HAN-based propellant supply source 204 through the first connection line 222 into the upstream reception section 246 of the chamber 214. In an embodiment, the HAN-based propellant may further comprise an additional oxidizer. Thus, the HAN-based propellant and oxidizer may flow into the upstream reception section 246. In another embodiment in which the HAN-based propellant is stored separately from the additional oxidizer, the oxidizer is introduced to the combustion chamber with the aspirated non polar fuel before HAN-based propellant entry into the chamber 214. To do so, the oxidizer supply source 215 may flow the oxidizer through the oxidizer line 223 into the first connection line 222. A spark igniter starts the combustion of the oxidizer and the non-polar fuel thereby pressurizing the chamber 214 with high temperature gas. The HAN-based propellant is then decomposed by passing through the decomposer 208 and introduced to the aspirated non-polar fuel in the presence of the high temperature gas. For instance, in an embodiment, the vaporized HAN-based propellant may be catalytically decomposed. In another embodiment, the vaporized HAN-based propellant may be thermally decomposed. The decomposed HAN-based propellant is then flowed into the downstream combustion section 248 of the chamber 214.

The aspirated non-polar fuel is produced by flowing non-polar fuel from the non-polar fuel source 206 through the second connection line 240 and through the aspirator 210. The non-polar fuel is transformed into a mist that is then introduced into the downstream combustion section 248 of the chamber 214.

In an embodiment, the decomposed HAN-based propellant may be introduced into the chamber before the aspirated non-polar fuel is introduced therein. In another embodiment, the decomposed HAN-based propellant may be introduced into the chamber after the aspirated non-polar fuel is introduced therein. In still another embodiment, the decomposed HAN-based propellant may be introduced into the chamber substantially simultaneously with the aspirated non-polar fuel. In any case, the decomposed HAN-based propellant and the non-polar fuel may be introduced at substantially similar and at substantially similar flow rates. For example, suitable pressures may be within a range of between about 100 psig and about 2000 psig; however, the pressures may be greater or less in other embodiments. Suitable flow rates will be dependent on the desired thrust.

After the decomposed HAN-based propellant and the aspirated non-polar fuel are introduced into the chamber, they are combusted to produce a thrust, step 304. In an embodiment, combustion occurs after a desired ratio of propellant to fuel is achieved. The desired ratio may be about 1 to 7 of propellant to fuel, in an embodiment. In other embodiments, the ratio may be greater or smaller. The particular ratio may depend on various factors, such as the desired thrust, a desired characteristic velocity (C*), a desired change in momentum per unit of propellant (i.e., specific impulse (Isp)) or combustion temperature. Combustion may be achieved using the combustor 211, in an embodiment.

FIG. 4 illustrates another method 400 of propelling a vehicle, according to an embodiment, that also may be performed using system 200 shown in FIG. 2. Here, the aspirated non-polar fuel is introduced into the chamber at a first pressure and ignited, step 402. The decomposed HAN-based propellant is flowed into the chamber at a second pressure and added to the ignited aspirated non-polar fuel to thereby produce a thrust to propel the vehicle, step 404.

As mentioned above, the aspirated non-polar fuel is introduced into the chamber, step 402. In this regard, the aspirated non-polar fuel is produced by flowing non-polar fuel from the non-polar fuel source 206 through the second connection line 240 and through the aspirator 210. The non-polar fuel is transformed into a mist that is then introduced into the downstream combustion section 248 of the chamber 214. In an embodiment, the non-polar fuel is introduced at a first pressure that may be a pressure within a range of between about 100 psig and about 500 psig. In another embodiment, the first pressure may be greater than or less than the pressures in the aforementioned range.

In still another embodiment, an oxidizer is introduced into the chamber either before or after introduction of the aspirated non-polar fuel. To do so, the oxidizer supply source 215 may flow the oxidizer through the oxidizer line 223 into the first connection line 222 for entry into the upstream reception section 246 of the chamber 214. The oxidizer then may be vaporized, in an embodiment. For example, the oxidizer may pass through the vaporizer 244, which transforms the oxidizer into a mist. In an embodiment, the vaporized oxidizer may be decomposed by passing the vaporized oxidizer through the decomposer 208. For example, the vaporized oxidizer may be catalytically or thermally decomposed. In another embodiment, the vaporized oxidizer may bypass the decomposer 208 and may not be decomposed. In any case, the oxidizer flows into the downstream combustion section 248 of the chamber 214 to be mixed with the aspirated non-polar fuel.

The oxidizer may be introduced into the chamber 214 at a pressure of 100 and 500 psig and with flow rates that are suitable to achieve combustion with the pressure and flow of the non-polar fuel, in an embodiment. When a desired ratio of the oxidizer and the aspirated non-polar fuel are present in the chamber, the oxidizer and fuel may be ignited. The desired ratio may a ratio that is within 30% of that required in order to provide a balanced chemical equation of oxidizer relative to the non-polar fuel to form a thermodynamically stable product. Ignition may be achieved by the combustor 211, in an embodiment.

The decomposed HAN-based propellant is then flowed into the chamber 214 at a second pressure, step 404. The decomposed HAN-based propellant may be produced by flowing HAN-based propellant from the HAN-based propellant supply source 204 through the first connection line 222 into the upstream reception section 246 of the chamber 214. The HAN-based propellant is then decomposed by passing through the decomposer 208. In an embodiment, the HAN-based propellant is catalytically decomposed after injection. In another embodiment, the HAN-based propellant is thermally decomposed after injection. The decomposed HAN-based propellant is then injected into the downstream combustion section 248 of the chamber 214.

In an embodiment, the decomposed HAN-based propellant enters the chamber after the aspirated non-polar fuel is ignited. In such case, the decomposed HAN-based propellant is flowed into the chamber 214 at a second pressure that is higher than the first pressure. For example, the second pressure may be between about 120 psig and about 2500 psig. In another embodiment, the second pressure may be higher than the aforementioned pressure range. In still another embodiment, the decomposed HAN-based propellant is introduced into the chamber, while an additional portion of aspirated non-polar fuel and oxidizer (in some embodiments) are simultaneously supplied to the chamber 214. In such case, the pressure of the additional portion of aspirated non-polar fuel and oxidizer (if included) may be increased to a third pressure that may be substantially equal to or greater than the second pressure. The flow rate of the decomposed HAN-based propellant may or may not be substantially equal to the flow rate of the aspirated non-polar fuel. Regardless, the decomposed HAN-based propellant ignites when contacted with the ignited non-polar fuel to thereby produce exhaust gases which are exhausted out of the exhaust outlet 216 to propel the vehicle in a desired direction.

By introducing the decomposed HAN-based propellant into an aspirated non-polar fuel and combusting the two, a specific impulse created from the combustion may be greater than the specific impulse produced by conventional propulsion systems. For example, the aforementioned system and methods may create specific impulse of at least 250 seconds, and in some cases, up to 350 seconds. Additionally, the aforementioned systems and methods may be relatively less expensive, lighter in weight, and simpler to implement than conventional propulsion systems.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of propelling a vehicle, the method comprising the steps of:
   injecting a hydroxylammonium nitrate (HAN)-based propellant;
   forming decomposed HAN-based propellant by passing the HAN-based propellant through a bed;
   flowing the decomposed HAN-based propellant into a chamber;
   introducing an aspirated non-polar fuel into the chamber; and
   combusting the decomposed HAN-based propellant and the aspirated non-polar fuel to produce an exhaust gas.

2. The method of claim 1, wherein the bed comprises a catalyst bed.

3. The method of claim 1, wherein the bed comprises a thermal bed.

4. The method of claim 1, further comprising adding an oxidizer to the HAN-based propellant.

5. The method of claim 1, wherein the HAN-based propellant comprises hydroxylammonium nitrite, water, and an additional oxidizer and decomposing the HAN-based propellant.

6. The method of claim 1, wherein the step of flowing a decomposed HAN-based propellant into a chamber, and the step of introducing an aspirated non-polar fuel into the chamber occur at substantially similar pressures.

7. A method of propelling a vehicle, the method comprising the steps of:
   injecting a hydroxylammonium nitrate (HAN)-based propellant;
   forming decomposed HAN-based propellant by passing a HAN-based propellant through a bed;
   introducing an aspirated non-polar fuel into a chamber at a first pressure;
   igniting the aspirated non-polar fuel; and
   flowing the decomposed HAN-based propellant into the chamber at a second pressure to thereby produce a thrust to propel the vehicle.

8. The method of claim 7, further comprising flowing an oxidizer into the chamber before the step of introducing the aspirated non-polar fuel.

9. The method of claim 7, further comprising flowing an oxidizer into the chamber before the step of introducing the aspirated non-polar fuel and before the step of igniting.

10. The method of claim 7, further comprising igniting an oxidizer and the aspirated non-polar fuel, before the step of flowing of the decomposed HAN-based propellant.

11. The method of claim 7, further comprising igniting a mixture including the aspirated non-polar fuel and the decomposed HAN-based propellant with a spark.

12. The method of claim 7, wherein the bed comprises a catalyst bed.

13. The method of claim 7, wherein the bed comprises a thermal bed.

14. The method of claim 7, wherein the second pressure is greater than the first pressure.

15. The method of claim 7, wherein the step of flowing comprises substantially simultaneously supplying an additional portion of aspirated non-polar fuel into the chamber during the step of flowing and after the step of introducing, wherein the additional portion of aspirated non-polar fuel is supplied to the chamber at a third pressure that is substantially equal to or greater than the second pressure.

16. The method of claim 7, wherein the the HAN-based propellant comprising comprises hydroxylammonium nitrite and an oxidizer and decomposing the HAN-based propellant.

17. A system for propelling a vehicle, the system comprising:
   a vessel that defines a chamber;
   a decomposer positioned in the chamber to divide the chamber into an upstream reception section and a downstream combustion section, wherein the decomposer is adapted to decompose a hydroxylammonium nitrate (HAN)-based propellant provided to the upstream reception section and to provide a decomposed HAN-based propellant to the downstream reception section;
   an aspirator adapted to aspirate a non-polar fuel in order to provide an aspirated non-polar fuel to the downstream combustion section; and
   a combustor disposed in communication with the chamber, and adapted to receive and combust the decomposed HAN-based propellant and the aspirated non-polar fuel to produce an exhaust gas.

18. The system of claim 17, further comprising an exhaust outlet in flow communication with the chamber and adapted to exhaust the exhaust gas for propelling the vehicle.

* * * * *